(12) United States Patent
Berning et al.

(10) Patent No.: US 6,438,703 B1
(45) Date of Patent: Aug. 20, 2002

(54) METHOD AND SYSTEM FOR SELECTIVELY VARYING SIGNAL DELAY IN RESPONSE TO DETECTION OF A QUIESCENT SIGNAL

(75) Inventors: Lynn Charles Berning; Richard Greenberg, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,982

(22) Filed: May 10, 1999

(51) Int. Cl.[7] .............................. G06F 1/04
(52) U.S. Cl. ...................... 713/401; 713/503
(58) Field of Search .................. 360/45, 51; 713/400, 713/401, 503, 600

(56) References Cited

U.S. PATENT DOCUMENTS

| | | | | |
|---|---|---|---|---|
| 3,641,506 A | * | 2/1972 | Cupp et al. ............. | 340/172.5 |
| 5,493,454 A | * | 2/1996 | Ziperovich et al. ........... | 360/45 |
| 5,778,214 A | * | 7/1998 | Taya et al. .................. | 713/400 |
| 6,260,154 B1 | * | 7/2001 | Jeddeloh ..................... | 713/401 |

* cited by examiner

*Primary Examiner*—Dennis M. Butler
(74) *Attorney, Agent, or Firm*—Bracewell & Patterson, LLP

(57) ABSTRACT

An electrical signal is communicated between a first device and a second device during a plurality of active clock periods, where the electrical signal is in one of multiple possible states during each of the active clock periods. Timing circuitry within one of the first and second devices detects a predetermined sequence of states in the electrical signal, and in response to detecting the predetermined sequence, adjusts the timing of a subsequent state of the electrical signal with respect to an associated active clock period. Adjustment of signal timing in this manner is useful in reducing signal error due to the line charging effect.

26 Claims, 7 Drawing Sheets

METHOD AND SYSTEM FOR SELECTIVELY VARYING SIGNAL DELAY IN RESPONSE TO DETECTION OF A QUIESCENT SIGNAL

BACKGROUND OF THE INVENTION

1. Technical Field

The present invention relates in general to electronic systems and, in particular, to communication of electrical signals in electronic systems. Still more particularly, the present invention relates to a method and system for selectively varying the signal delay applied to an electrical signal communicated between two electrical devices in response to detecting a selected data sequence, such as quiescence of the electrical signal.

2. Description of the Prior Art

When transmitting data via a transmission line such as a bus signal line, more energy is required to change the state of the bus signal line if the bus signal line has remained in a steady state for a long period of time than if the state of the bus signal line has transitioned recently. This phenomenon, which is due to the capacitance of the bus signal line, is often referred to as line charging effect. For data buses that require alignment of data transitions with bus clock transitions, the line charging effect may cause the data signal line to transition later in time than the clock signal line. As a result, a data receiver connected to the bus will observe a reduced setup time for the data signal.

At slower data transfer rates, the line charging effect can be accommodated in the skew timing budget. However, at faster data transfer rates having concomitantly smaller skew timing budgets, the line charging effect may cause the data signal to fail the setup time of the data receiver, thus inducing data errors. The present invention therefore recognizes that it would be useful and desirable to provide a method and system for reducing the line charging effect of data signal lines in order to support faster data transfer rates.

In prior art magnetic storage systems, such as magnetic disk and tape drives, it has been known that high storage densities can cause magnetic interference between adjacent data during read operations. This interference, which is sometimes referred to as inter-symbol interference (ISI), can reduce the sensed magnitude of data and shift the apparent position of data peaks, thereby inducing errors when reading data. To minimize the influence of ISI, and in particular to reduce peak shift, various techniques have been employed, including pulse-slimming and precompensation. Precompensation entails shifting the write signal that encodes the data in the magnetic medium in the opposite direction than the signal is shifted by ISI when read. As a result, the peak shift observed during read operations can be reduced or eliminated. The present invention includes a recognition that a different form of precompensation can also advantageously be utilized to reduce or eliminate errors in data transmission arising from the line charging effect.

SUMMARY OF THE INVENTION

According to the present invention, an electrical system includes a first device and a second device coupled by at least one signal line. An electrical signal is communicated between the first device and the second device during a plurality of active clock active periods, where the electrical signal is in one of multiple possible states during each of the active clock periods. Timing circuitry within one of the first and second devices detects a predetermined sequence of states in the electrical signal, and in response to detecting the predetermined sequence, adjusts the timing of a subsequent state of the electrical signal with respect to an associated active clock period. Adjustment of signal timing in this manner is useful in reducing signal error due to the line charging effect.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
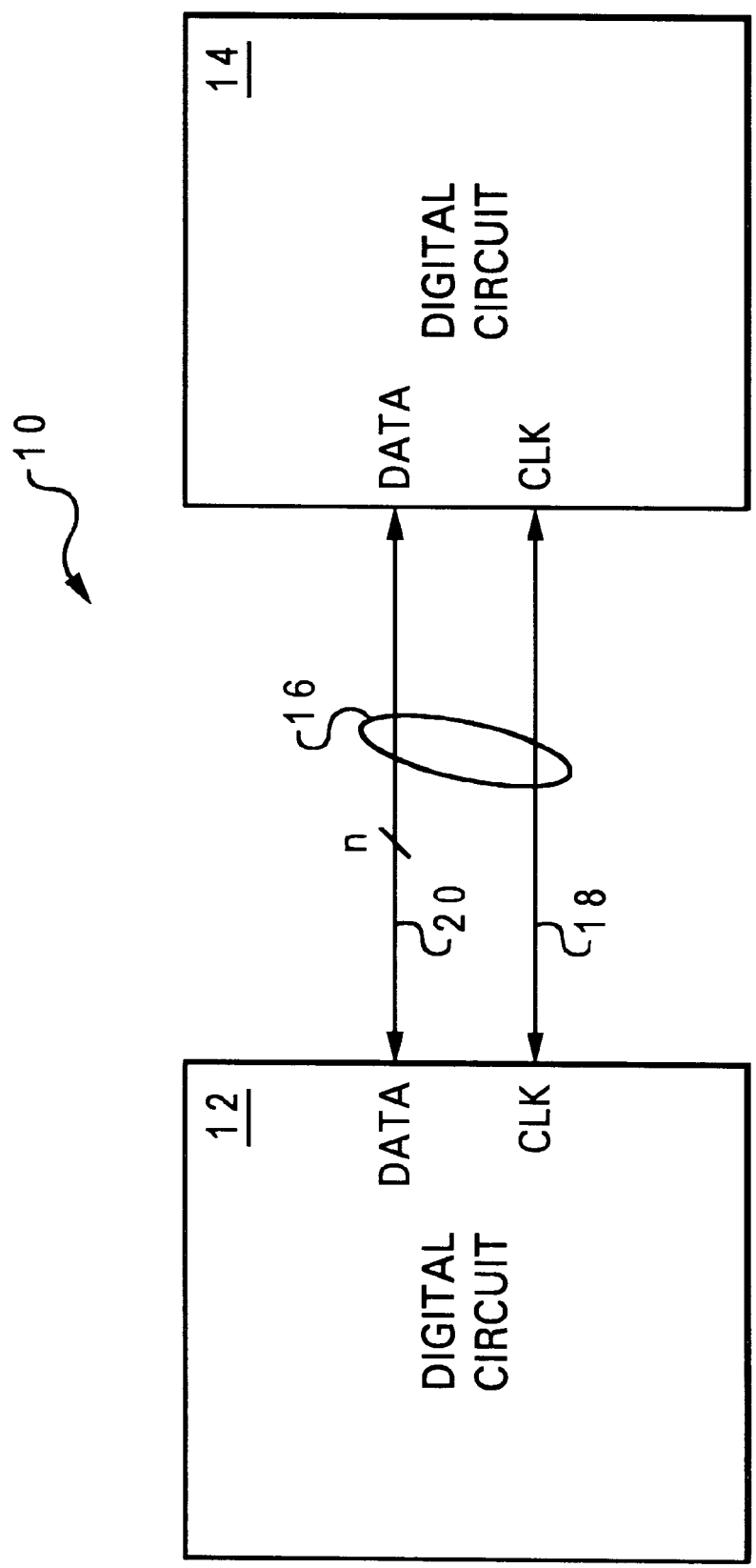
FIG. 1 depicts an illustrative embodiment of an electrical system with which the present invention may advantageously be utilized.

With reference now to the figures and in particular with reference to FIG. 1, there is depicted an illustrative embodiment of an electrical system with which the present invention may advantageously be utilized to reduce the line charging effect-induced timing skew between a data signal and a clock signal. As illustrated, system 10 includes a digital circuit 12 and a digital circuit 14, which are coupled by an interconnect 16 including a clock signal line 18 and an N-bit data bus 20 comprising N data signal lines (where $N \geq 1$).

Digital circuits 12 and 14, which can be formed either of discrete components or of integrated circuitry, communicate data (including addresses, if applicable) via data bus 20. During each active period (e.g., cycle or half-cycle) of the clock signal transmitted via clock signal line 18, each data signal can be in any of at least two possible states, which preferably include logic high ("1") and logic low ("0"). The data signals may individually transition between states in response to the active edges of the clock signal. Depending upon implementation, the active clock signal edges can include only rising edges, only falling edges, or both rising and falling edges. The clock signal conveyed by clock signal line 18 can be generated by either of digital circuits 12 and 14 or can be generated by a separate clock generator (not illustrated).

As discussed above, individual data signal lines within data bus 20 may remain in the same state (e.g., either logic high or logic low) for several consecutive active periods of the clock signal. In order to avoid data errors at a receiving device among digital circuits 12 and 14 due to the line charging effect, the present invention detects a quiescent data signal and advances the timing of a subsequent state of the data signal with respect to an associated active period of the clock. An exemplary embodiment of timing circuitry that may be utilized within a sending device among digital circuits 12 and 14 to adjust signal timings in this manner is shown in FIG. 2.

Figure 2:
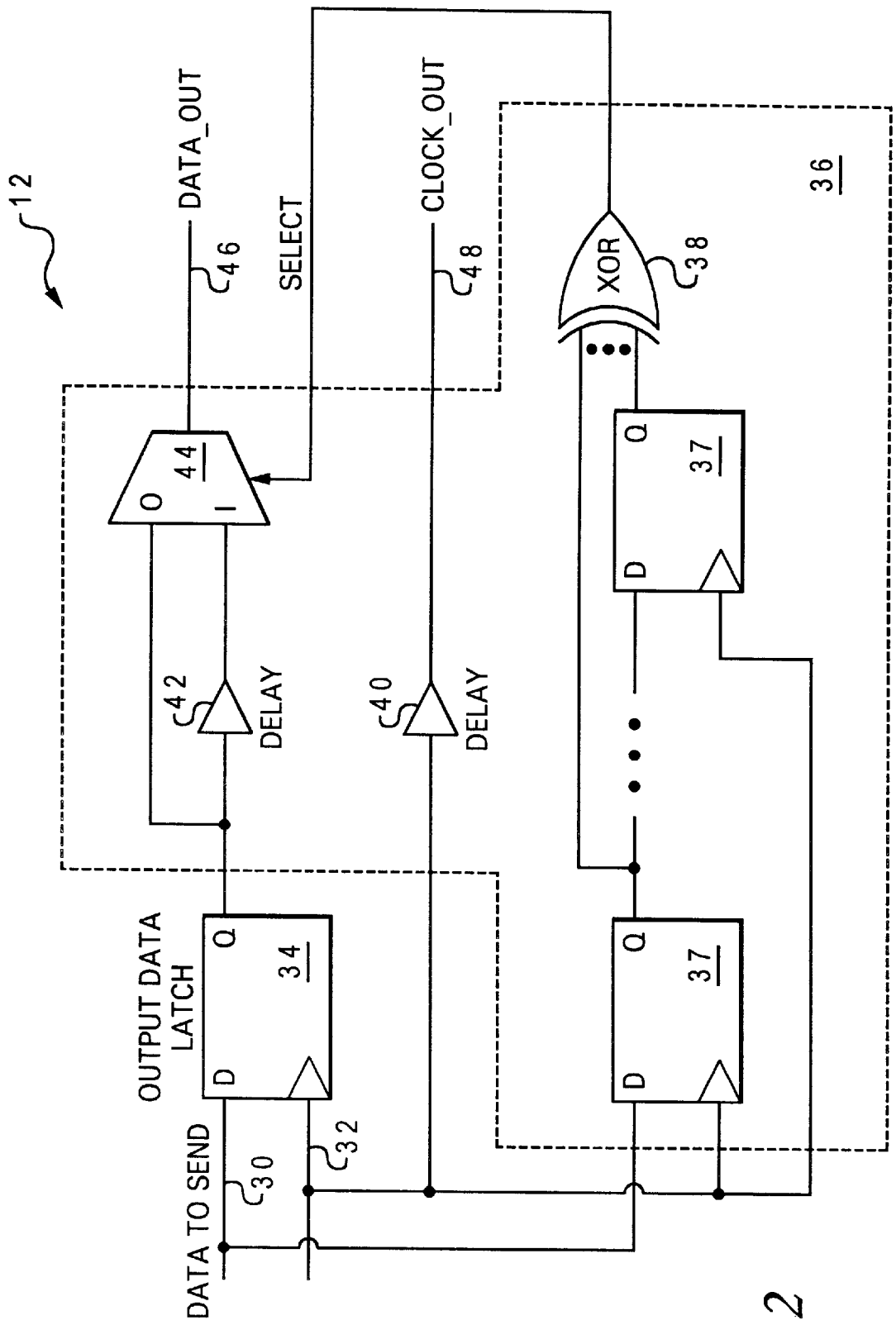
FIG. 2 illustrates an exemplary embodiment of a timing circuit for a sending device that compensates for the line charging effect.

Referring now to FIG. 2, a sending device within system 10 (e.g., digital circuit 12) includes internal circuitry that generates at least one data signal 30 to be transmitted via data bus 16 in conjunction with a clock signal 32. Each data signal 30 is provided as an input to a respective set of communication circuitry 34 and timing circuitry 36 in conjunction with clock signal 32. As shown, communication circuitry 34 can be implemented as a data latch 34 that latches and outputs the state of data signal 30 in response to active edges of clock signal 32. The timing relationship between the DATA_OUT and CLOCK_OUT signals 46 and 48 produced from data and clock signals 30 and 32, respectively, is determined by timing circuitry 36.

In the illustrative embodiment, timing circuitry 36 includes P (where P≧2) series-connected timing latches 36 that each receive clock signal 32 as a clock input and, except for the first timing latch 36 which receives data signal 30, each receive the output of a preceding timing latch 36 as a data input. The data outputs of all of timing latches 36 form inputs of an XOR gate 38 that has a logic low output ("0") when the outputs of all of timing latches 36 are identical and has a logic high output ("1") otherwise. Timing circuitry 36 further includes a multiplexer 44 that receives the output of data latch 34 as a first data input and receives the same signal delayed by data delay 42 as a second data input. The output of XOR gate 38 forms the select input of multiplexer 44, which selects one of its data inputs as DATA_OUT signal 46. Timing circuitry 36 finally includes a clock delay 40 that receives clock signal 32 as an input and outputs a delayed clock signal as CLOCK_OUT signal 48. The latencies associated with data delay 42 and clock delay 40 are preferably selected such that transitions of DATA_OUT signal 46 and CLOCK_OUT signal 48 are aligned when the data signal path includes data delay 42.

During operation, timing latches 36 hold a running history of the states of data signal 30 during the last P consecutive active periods of clock signal 32. If the state of data signal 30 has varied during the last P consecutive active periods of clock signal 32, the output of XOR gate 38 will be logic high ("1"), and multiplexer 44 will select the data signal delayed by data delay 42 as DATA_OUT signal 46. Thus, transitions of DATA_OUT signal 46 will be aligned or nearly aligned with CLOCK_OUT signal 48. However, if data signal 30 has been in one of its possible states and has avoided another of its possible states during all of the last P consecutive active periods, a transition of DATA_OUT signal 46 will take longer than a transition of CLOCK_OUT signal 48 due to the line charging effect. To compensate for the line charging effect, XOR gate 38 outputs a logic low ("0") signal, which causes multiplexer 44 to select undelayed data input as DATA_OUT signal 46. As a result, the transition of DATA_OUT signal 46 will begin prior to the corresponding transition of CLOCK_OUT signal 48. Of course, the number of active periods that data signal 30 must remain quiescent before timing circuit 36 compensates for the line charging effect can be controlled by the selecting the number of timing latches 36, for example, in response to the length of data bus 20 and other factors influencing its capacitive characteristics.

Figure 3A:
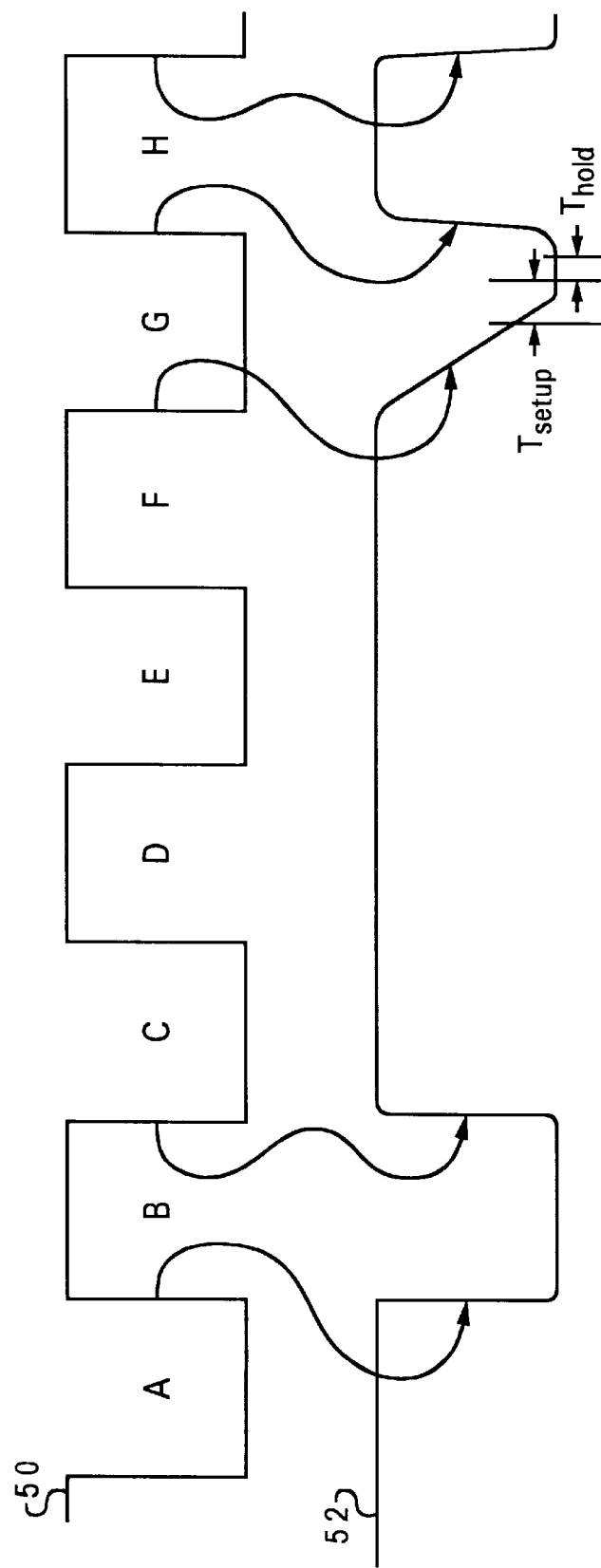
FIG. 3A is an exemplary timing diagram illustrating the line charging effect.

With reference now to FIG. 3A, there is illustrated an exemplary timing diagram depicting the line charging effect on a data transmission line. As shown, a clock signal 50 oscillates between a logic high state ("1") and a logic low state ("0") at a selected frequency. Both rising and falling edges of clock signal 50 are active clock edges at which a data signal 52 may transition, and thus the active period is a half-cycle.

Because data signal 52 has been transitioning closely prior to half-cycle B of clock signal 50, the transitions of data signal 52 during half-cycle B are aligned or nearly aligned with the rising and falling edges of half-cycle B. Data signal 52 is then quiescent for four half-cycles and remains in a logic high ("1") state. Due to the line charging effect, when data signal 52 again transitions during half-cycle G of clock signal 50, the transition is delayed with respect to the falling edge of half-cycle G. As a result, the transition of data signal 52 fails the setup time $\tau_{setup}$ of a receiving device receiving data signal 52 as an input, which may induce a data error. Thereafter, during half-cycle H, the transitions of clock signal 52 are aligned or nearly aligned with the rising and falling edges of clock signal 50.

Figure 3B:
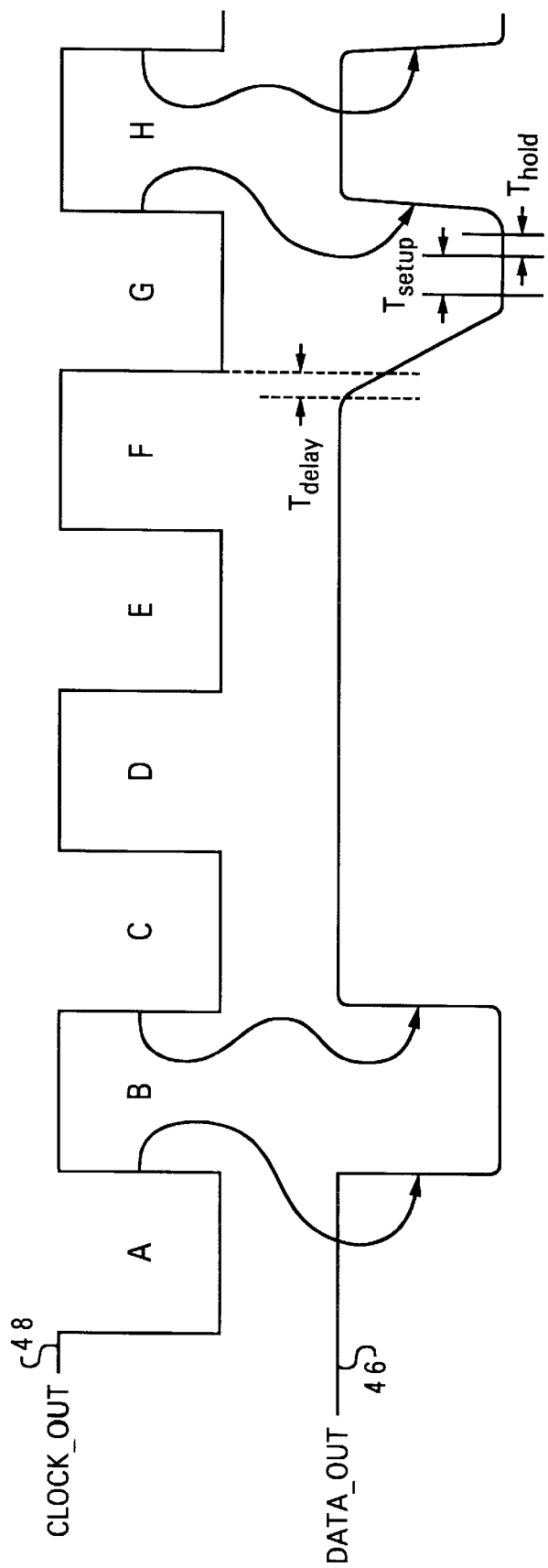
FIG. 3B is an exemplary timing diagram depicting compensating for the line charging effect in accordance with the present invention.

Referring now to FIG. 3B, there is depicted an exemplary timing diagram depicting compensation for the line charging effect in accordance with a preferred embodiment of the present invention. In this preferred embodiment, interconnect 16 may comprise a Small Computer System Interface (SCSI) bus, and digital circuits 12 and 14 may each comprise a SCSI adapter or controller, as discussed further with respect to FIG. 6. As with the timing example shown in FIG. 3A, CLOCK_OUT signal 48 oscillates between a logic high ("1") and logic low ("0") states at a selected frequency (e.g., 25 MHz), and both the rising and falling edges of CLOCK_OUT signal 48 are active clock edges.

As above, DATA_OUT signal 46 has been transitioning closely prior to half-cycle B of CLOCK_OUT signal 48, and the transitions of DATA_OUT signal 46 during half-cycle B are aligned or nearly aligned with the rising and falling edges of half-cycle B. DATA_OUT signal 46 is then quiescent for four half-cycles and remains in a logic high ("1") state. Timing circuit 36 detects that DATA_OUT signal 46 has remained in the logic high state for more than P active periods, and compensates for the line charging effect by advancing the next falling transition of DATA_OUT signal 46 with respect to the falling edge of half-cycle G of CLOCK_OUT signal 48. As depicted, the transition of DATA_OUT signal 46 leads the transition of CLOCK_OUT signal by $\tau_{delay}$, which is the delay associated with data delay 42. Due to this precompensation of DATA_OUT signal 46, the transition of DATA_OUT signal 52 meets the setup time $\tau_{setup}$ of a receiving device receiving DATA_OUT signal 52.

Figure 4:
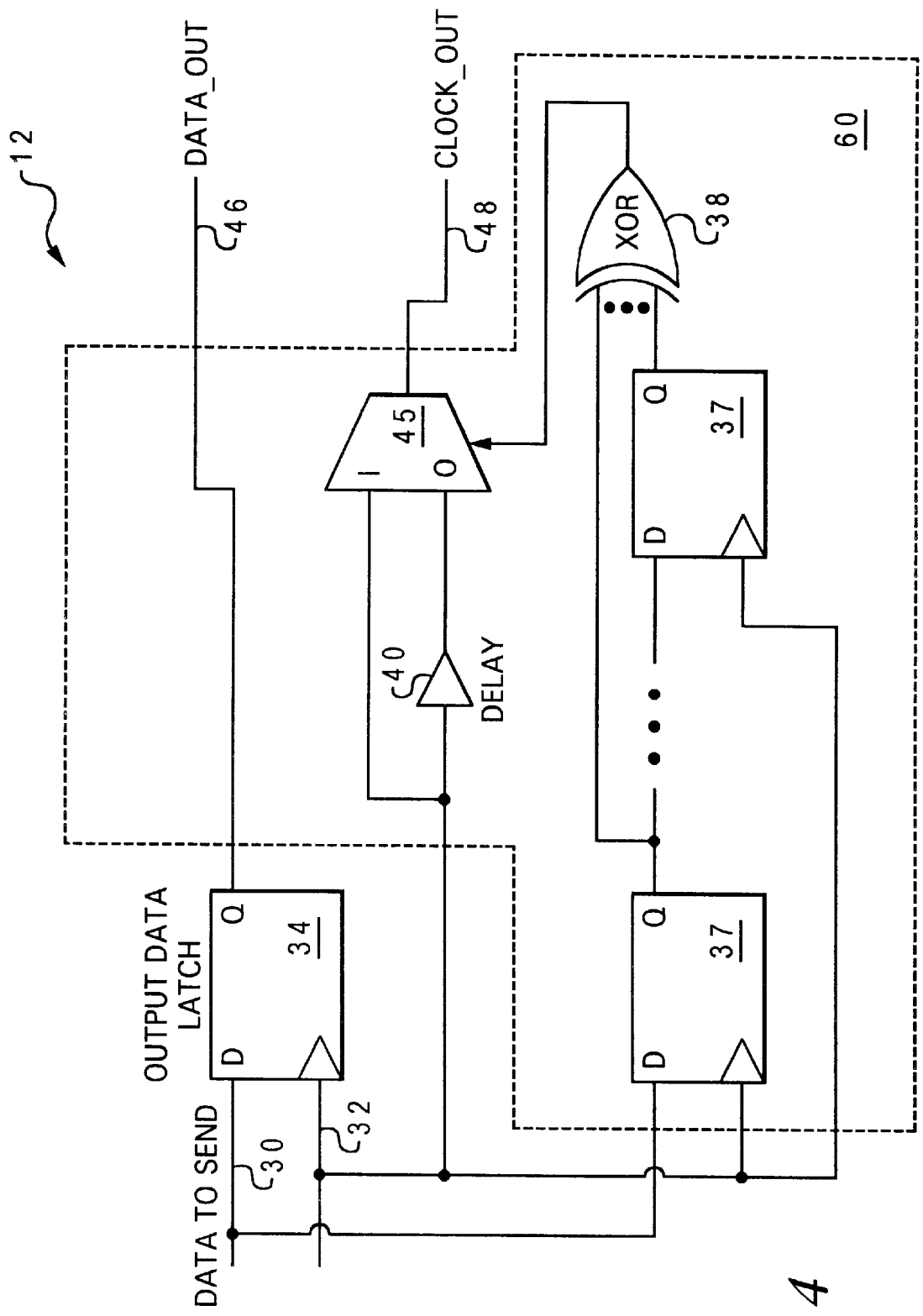
FIG. 4 depicts an alternative embodiment of a timing circuit within a sending device that compensates for the line charging effect.

The principles of the present invention as described above can be implemented in a number of alternative embodiments. For example, with reference now to FIG. 4, there is illustrated an alternative embodiment of a sending device in accordance with the present invention. In FIG. 4, like reference numerals indicate corresponding and like elements to those shown in FIG. 2. As becomes apparent upon comparison of FIGS. 2 and 4, the timing circuit 60 of FIG. 4 is similar to timing circuit 36 of FIG. 2, except that data delay 42 is omitted and timing delay 40 is selectively applied to CLOCK_OUT signal 48 by a multiplexer 45 in response to the output of XOR gate 38. Thus, timing circuit 60 of FIG. 4 compensates for the line charging effect by delaying CLOCK_OUT signal 48 rather than by advancing DATA_OUT signal 46.

Figure 5:
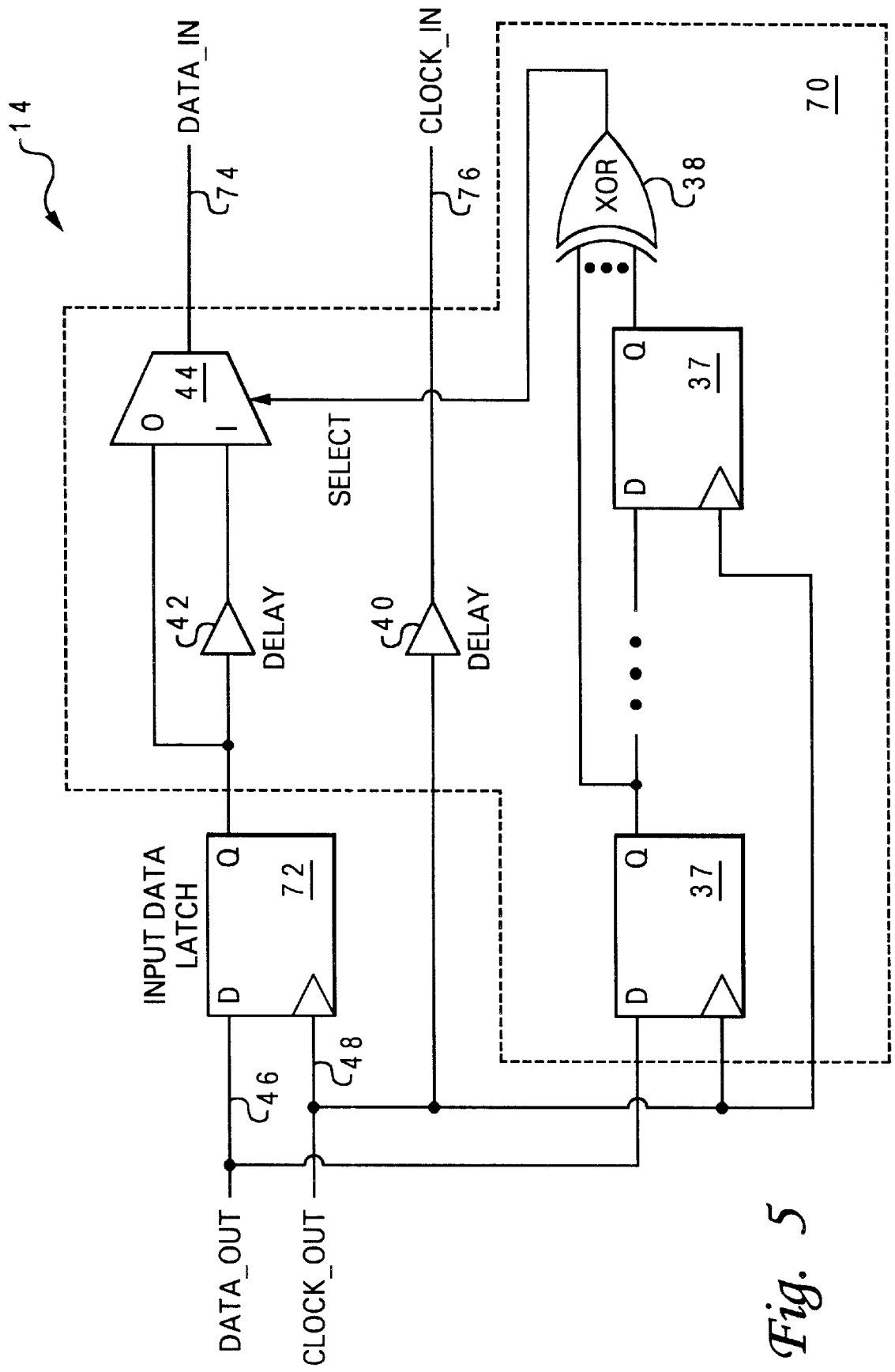
FIG. 5 illustrates an alternative embodiment of a timing circuit within a receiving device that compensates for the line charging effect.

The present invention may also be applied to a receiving devices in an electrical system in order to compensate for the line charging effect after data has been received (i.e., perform post-compensation). For example, FIG. 5 illustrates an embodiment of digital circuit 14 of FIG. 1 in which digital circuit 14 receives both DATA_OUT signal 46 and CLOCK_OUT signal 48 as inputs. As shown, digital circuit 14 includes communication circuitry such as data latch 72 for latching and outputting DATA_OUT signal 46 in response to active edges of CLOCK_OUT signal 48. Digital circuit 14 further includes timing circuitry 70 having the same components, arrangement, and operation as timing circuit 36 of FIG. 2. Timing circuitry 70 detects whether DATA_OUT signal 46 has been quiescent for P active periods of CLOCK_OUT signal 48, and if so, advances a subsequent transition of DATA_IN signal 74 (which forms an input of the internal circuitry of digital circuit 14) with respect to a CLOCK_IN signal 76. Thus, timing circuitry 70 eliminates data errors arising from the line charging effect by post-compensation of a received data signal. Timing circuitry within a receiving device could alternatively be configured to perform post-compensation on the CLOCK_IN signal utilizing timing circuitry 60 depicted in FIG. 4.

Figure 6:
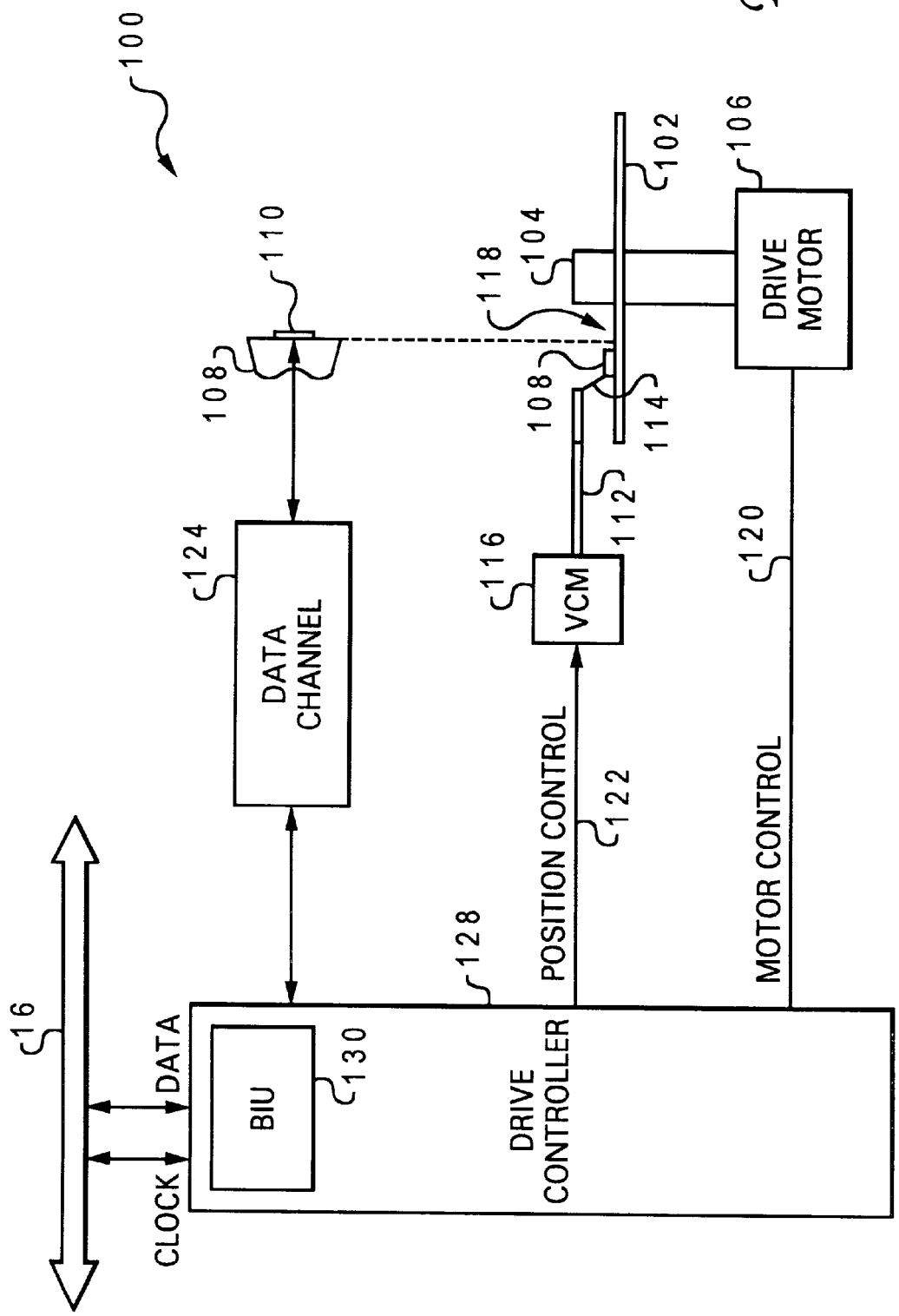
FIG. 6 depicts a magnetic storage device including a timing circuit in accordance with the present invention.

Referring now to FIG. 6, there is depicted an illustrative embodiment of a magnetic storage device containing a timing circuit in accordance with the present invention. As shown, magnetic storage device 100, which may comprise, for example, a SCSI disk drive, includes a housing (not illustrated) containing at least one rotatable magnetic disk 102 supported on a spindle 104 and rotated by a drive motor 106. Each magnetic disk 102 has a magnetic recording medium formed on at least one disk surface 118, where the magnetic recording medium is arranged in an annular pattern of concentric data tracks (not shown). At least one slider 108 including one or more magnetic read/write heads 110 is positioned over magnetic disk 102. Slider 108 is suspended from an actuator arm 112 by a suspension 114 (also referred to as a head gimbal assembly (HGA)). The radial position of slider 108 with respect to the tracks of magnetic disk 102 is controlled by voice coil motor (VCM) 116.

During operation of magnetic storage device 100, the rotation of magnetic disk 102 generates an air bearing between slider 108 and disk surface 118. The air bearing thus counterbalances the slight downward-biased spring force of suspension 114 and supports slider 108 above disk surface 118 by a small, substantially constant spacing. As magnetic disk 102 is rotated by drive motor 106, slider 108 is moved radially in and out in response to the movement of actuator arm 112 by VCM 116, thus permitting magnetic read/write head 110 to read or write data of interest in different tracks. Read and write signals are communicated to and from read/write head 110 via data channel 124, which includes conductor lines running along suspension 114 and actuator arm 112.

The various components of magnetic storage device 100 are controlled during operation by signals generated by drive controller 128. The control signals generated by drive controller 128 include motor control signals 120, which control the rotation of spindle 104 by drive motor 106, and head position control signals 122, which provide the desired current profiles to optimally move and position a selected slider 108 to a desired data track on the associated magnetic disk 102. Drive controller 128 also includes a Bus Interface Unit (BIU) that handles data communication between magnetic storage device 100 and interconnect 16, which may comprise a SCSI bus, for example. In accordance with the present invention, BIU 130 includes (in addition to communication circuitry) at least one timing circuit that performs either timing pre-compensation for transmitted signals (e.g., like timing circuits 36 and 60 of FIGS. 2 and 4, respectively) or timing post-compensation for received signals (e.g., like timing circuit 70 of FIG. 5).

As has been described, the present invention provides a method and system for detecting and compensating for signal delay due to the line charging effect. According to the present invention, a timing circuit is provided within either a sending device or a receiving device coupled to a data signal line. The timing circuit detects if the data signal line has been quiescent for a predetermined number of active periods of a clock signal, and if so, advances a subsequent transition of the data signal line with respect to an associated active period of the clock signal.

While the invention has been particularly shown and described with reference to a preferred embodiment, it will be understood by those skilled in the art that various changes in form and detail may be made therein without departing from the spirit and scope of the invention. Thus, while the present invention may be utilized to compensate for improper signal timing resulting from the line charging effect, the present invention is not limited to such applications. More generally, the present invention recognizes that one or more predetermined sequences of signal states (i.e., data sequences) may require that the timing of subsequent changes in signal state be advanced or retarded with respect to a reference or clock signal. One example of a reason to adjust signal timing in response to a detected data sequence other than to compensate for the line charging effect is to compensate for unsymmetrical drivers that have different delays associated with high-to-low and low-to-high state transitions.

When greater control of signal timing is desired, finer granularity in timing adjustment may be employed. For example, it may be desirable to select the amount of time that a signal transition is advanced or retarded based upon the amount of time the signal has been quiescent, with a greater timing adjustment being made for longer periods of quiescence and less timing adjustment being made for shorter periods of quiescence. Alternatively or in addition, different quanta of timing adjustment can be associated with each of a plurality of different data patterns.

What is claimed is:

1. A method for communicating an electrical signal between two devices, said method comprising:

communicating an electrical signal between a first device and a second device during a plurality of active clock periods of a clock signal, said electrical signal being in one of a plurality of possible states during each of said plurality of active clock periods;

detecting whether said electrical signal has remained in a same state over a predetermined plurality of consecutive active clock periods;

in response to said detection, advancing timing of a subsequent state of said electrical signal with respect to said clock signal for at least one associated active clock period; and in response to said electrical signal changing state, ceasing to advance timing of said electrical signal with respect to said clock signal.

2. The method of claim 1, said determination further comprising counting a number of consecutive active clock periods that said electrical signal has remained in the same state utilizing a plurality of latches connected in series.

3. The method of claim 1, wherein advancing timing of a subsequent state of said electrical signal comprises transmitting said electrical signal earlier in time with respect to an associated active clock period.

4. The method of claim 1, wherein advancing timing of a subsequent state of said electrical signal comprises advancing timing of a subsequent state of said electrical signal with respect to said electrical signal within a receiving device among said first and second devices.

5. The method of claim 1, said clock signal having at least one active edge, wherein advancing timing of a subsequent state of said electrical signal with respect to an associated active clock period comprises increasing a lead time of said state of said electrical signal with respect to a next active edge of said clock signal.

6. The method of claim 1, wherein communicating said electrical signal comprises communicating said electrical signal via a bus.

7. An electronic device, comprising:
communication circuitry that communicates an electrical signal during a plurality of active periods of a clock signal, said electrical signal being in one of a plurality of possible states during each of said plurality of active clock periods; and
timing circuitry that detects whether said electrical signal has remained in a same state over a predetermined plurality of consecutive active clock periods and, in response to said detection, advances timing of a subsequent state of said electrical signal with respect to said clock signal for at least one associated active clock period, and in response to said electrical signal changing state, ceases to advances timing of said electrical signal with respect to said clock signal.

8. The electronic device of claim 7, said timing circuitry comprising a plurality of latches connected in series that each latch a respective data input in response to a respective clock input, wherein a first of said plurality of latches has said electrical signal as a data input and all of said plurality of latches have said clock signal as a clock input.

9. The electronic device of claim 8, each of said plurality of latches having a data output, said timing circuitry further comprising:
logic circuitry that detects if data outputs of all of said plurality of latches are identical; and
selection circuitry, coupled to said logic circuitry, that selects a lower delay communication path for said electrical signal if said logic circuitry indicates that data outputs of all of said plurality of latches are identical.

10. The electronic device of claim 7, wherein said timing circuitry includes a selectably applied delay element that advances timing of a subsequent state of said electrical signal with respect to an associated active clock period prior to transmission of said electrical signal by said electronic device.

11. The electronic device of claim 7, wherein said timing circuitry includes a selectably applied timing element that advances timing of a subsequent state of said electrical signal with respect to an associated active clock period following receipt of said electrical signal by said electronic device.

12. The electronic device of claim 7, wherein said clock signal has at least one active edge, and wherein said timing circuitry advances timing of a subsequent state of said electrical signal with respect to an associated active clock period by increasing a lead time of said state of said electrical signal with respect to a next active edge of said clock signal.

13. The electronic device of claim 7, wherein said electronic device is a disk drive.

14. A system, comprising:
a first device and a second device coupled by a signal line, each of said first device and said second device including communication circuitry that communicates an electrical signal via said signal line during a plurality of active periods of a clock signal, said electrical signal being in one of a plurality of possible states during each of said plurality of active clock periods; and
timing circuitry, within at least one of said first device and said second device, that detects that said electrical signal has remained in a same state over a predetermined plurality of consecutive active clock periods and, in response to said detection, advances timing of a subsequent state of said electrical signal with respect to said clock signal for at least one associated active clock period, and in response to said electrical signal changing state, ceases to advance timing of said electrical signal with respect to said clock signal.

15. The system of claim 14, said timing circuitry comprising a plurality of latches connected in series that each latch a respective data input in response to a respective clock input, wherein a first of said plurality of latches has said electrical signal as a data input and all of said plurality of latches have said clock signal as a clock input.

16. The system of claim 15, each of said plurality of latches having a data output, said timing circuitry further comprising:
logic circuitry that detects if data outputs of all of said plurality of latches are identical; and
selection circuitry, coupled to said logic circuitry, that selects a lower delay communication path for said electrical signal if said logic circuitry indicates that data outputs of all of said plurality of latches are identical.

17. The system of claim 14, wherein said timing circuitry includes a selectably applied delay element that advances timing of a subsequent state of said electrical signal with respect to an associated active clock period prior to transmission of said electrical signal by said first device.

18. The system of claim 14, wherein said timing circuitry includes a selectably applied delay element that advances timing of a subsequent state of said electrical signal with respect to an associated active clock period following receipt of said electrical signal by said second device.

19. The system of claim 14, wherein said clock signal has at least one active edge, and wherein said timing circuitry advances timing of a subsequent state of said electrical signal with respect to an associated active clock period by increasing a lead time of said state of said electrical signal with respect to a next active edge of said clock signal.

20. A disk drive, comprising:
a data storage disk;
a motor that rotates said data storage disk;
means for reading data and writing data to and from said data storage disk;
a data channel conveying data to and from said means for reading data and writing data;
drive circuitry including:
communication circuitry that communicates an electrical signal on a signal line of a bus during a plurality of active periods of a clock signal, said electrical signal being in one of a plurality of possible states during each of said plurality of active clock periods; and
timing circuitry that detects that said electrical signal has remained in a same state over a predetermined plurality of active clock periods and, in response to said detection, advances timing of a subsequent state of said electrical signal with respect to said clock signal for at least one associated active clock period, and in response to said electrical signal changing state, ceases to advance timing of said electrical signal with respect to said clock signal.

21. The disk drive of claim 20, said timing circuitry comprising a plurality of latches connected in series that each latch a respective data input in response to a respective clock input, wherein a first of said plurality of latches has said electrical signal as a data input and all of said plurality of latches have said clock signal as a clock input.

22. The disk drive of claim 21, each of said plurality of latches having a data output, said timing circuitry further comprising:

logic circuitry that detects if data outputs of all of said plurality of latches are identical; and selection circuitry, coupled to said logic circuitry, that selects a lower delay communication path for said electrical signal if said logic circuitry indicates that data outputs of all of said plurality of latches are identical.

23. The disk drive of claim 20, wherein said timing circuitry includes a selectably applied delay element that advances timing of a subsequent state of said electrical signal with respect to an associated active clock period prior to transmission of said electrical signal by said communication circuitry via signal line of said bus.

24. The disk drive of claim 20, wherein said timing circuitry includes a selectably applied timing element that advances timing of a subsequent state of said electrical signal with respect to an associated active clock period following receipt of said electrical signal by said communication circuitry.

25. The disk drive of claim 20, wherein said clock signal has at least one active edge, and wherein said timing circuitry advances timing of a subsequent state of said electrical signal with respect to an associated active clock period by increasing a lead time of said state of said electrical signal with respect to a next active edge of said clock signal.

26. The disk drive of claim 20, wherein said disk drive is a Small Computer System Interface (SCSI)-compatible disk drive.

* * * * *